United States Patent
Balasubramaniyan et al.

(10) Patent No.: US 11,398,086 B2
(45) Date of Patent: Jul. 26, 2022

(54) SYSTEM AND METHOD FOR PERFORMING A CONVOLUTION OPERATION WITH FUNCTIONAL SAFETY MECHANISM

(71) Applicant: HCL Technologies Limited, New Delhi (IN)

(72) Inventors: Prasanna Venkatesh Balasubramaniyan, Chennai (IN); Sainarayanan Gopalakrishnan, Chennai (IN); Gunamani Rajagopal, Chennai (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 17/133,967

(22) Filed: Dec. 24, 2020

(65) Prior Publication Data

US 2021/0390324 A1 Dec. 16, 2021

(30) Foreign Application Priority Data

Jun. 1, 2020 (IN) .............................. 202011022975

(51) Int. Cl.
*G06V 10/98* (2022.01)
*G06N 20/10* (2019.01)
(Continued)

(52) U.S. Cl.
CPC ............ *G06V 10/98* (2022.01); *G06F 17/153* (2013.01); *G06K 9/6262* (2013.01); *G06N 3/04* (2013.01);
(Continued)

(58) Field of Classification Search
None
See application file for complete search history.

(56) References Cited

U.S. PATENT DOCUMENTS

| 7,036,059 B1 | 4/2006 | Carmichael et al. |
| 2014/0032968 A1* | 1/2014 | Nandam ............ G06F 11/2221 714/32 |

(Continued)

FOREIGN PATENT DOCUMENTS

WO    2018107476 A1    6/2018

OTHER PUBLICATIONS

Ma Y, Cao Y, Vrudhula S, Seo JS. Optimizing loop operation and dataflow in FPGA acceleration of deep convolutional neural networks. InProceedings of the 2017 ACM/SIGDA International Symposium on Field-Programmable Gate Arrays Feb. 22, 2017 (pp. 45-54). (Year: 2017).*

(Continued)

*Primary Examiner* — Emily C Terrell
*Assistant Examiner* — Nathan J Bloom
(74) *Attorney, Agent, or Firm* — Kendal Sheets (57) ABSTRACT

A Convolution Multiply and Accumulate-Xtended (CMAC-X) system (102) for performing a convolution operation with functional safety mechanism is disclosed. The CMAC-X system (102) receives image data pertaining to an image. The image data comprises a set of feature matrix, a kernel size and depth information. Further, the CMAC-X system (102) generates a convoluted data based on convolution operation for each feature matrix, The CMAC-X system (102) performs an accumulation of the convoluted data to generate accumulated data, when the convolution operation for each feature matrix is performed. The CMAC-X system (102) further performs an addition of a predefined value to the accumulated data to generate added data. Further, the CMAC-X system (102) filters the added data. Further, the CMAC-X system (102) comprises a functional safety unit to verify a functionality of the CMAC-X (Continued)

system (102), thereby performing the convolution operation of the image with functional safety mechanism.

14 Claims, 5 Drawing Sheets

(51) Int. Cl.
  *G06K 9/62* (2022.01)
  *G06N 3/04* (2006.01)
  *G06N 3/08* (2006.01)
  *G06T 1/20* (2006.01)
  *G06V 10/94* (2022.01)
  *G06F 17/15* (2006.01)

(52) U.S. Cl.
  CPC ............ *G06N 3/082* (2013.01); *G06N 20/10* (2019.01); *G06T 1/20* (2013.01); *G06V 10/94* (2022.01); *G06T 2200/28* (2013.01); *G06T 2207/20084* (2013.01)

(56) References Cited

U.S. PATENT DOCUMENTS

| | | | |
|---|---|---|---|
| 2018/0308561 A1* | 10/2018 | Koker | G11C 29/52 |
| 2018/0341495 A1 | 11/2018 | Culurciello et al. | |
| 2020/0218917 A1* | 7/2020 | Balasubramaniyan | G06F 17/153 |
| 2020/0326766 A1* | 10/2020 | Tsirkin | G06F 9/5083 |

OTHER PUBLICATIONS

Reimann F, Glaß, Teich J, Cook A, Gómez LR, Ull D, Wunderlich HJ, Engelke P, Abelein U. Advanced diagnosis: SBST and BIST integration in automotive E/E architectures. InProceedings of the 51st Annual Design Automation Conference Jun. 1, 2014 (pp. 1-9). (Year: 2014).*

R.V. Kshirsagar, R.Patrikar, "Design of a novel fault-tolerant voter circuit for TMR implementation to improve reliability in digital circuits", Microelectronics Reliability, vol. 49 Issue 12, 2009, pp. 1573-1577, ISSN 0036-2714 https://www.sciencedirect.com/science/article/pii/S0026271409003114 (Year: 2009).*

* cited by examiner

SYSTEM AND METHOD FOR PERFORMING A CONVOLUTION OPERATION WITH FUNCTIONAL SAFETY MECHANISM

CROSS-REFERENCE TO RELATED APPLICATIONS AND PRIORITY

The present application claims benefit from Indian Complete Patent Application No. 202011022975 filed on 1 Jun. 2020 the entirety of which is hereby incorporated by reference.

TECHNICAL FIELD

The present subject matter described herein, in general, relates to performing a convolution operation and more particularly to performing the convolution operation by using a Convolution Multiply and Accumulate-Xtended (CMAC-X) system with functional safety mechanism.

BACKGROUND

In recent times, Convolution Neural Network (CNN) technique is used for multiple applications in computer vision. The computer vision is used to detect a scene or an object in real time from an image captured in a system. In order to detect the object in real time, complex computations need to be performed by the system, it becomes difficult for the system to perform the computations due to limits of available on-chip resources. It is to be noted that hardware capabilities of the one or more available on-chip resources cannot be extended in real time. Thus, there is a need of fully configurable and low level complex processing elements to perform computation according to computation demand and the on-chip resource availability.

Moreover, most of the Deep Neural Network (DNN) which gets deployed in safety critical or mission critical applications such as automotive, medical or aerospace needs functional safety mechanisms and diagnostics features to be incorporated at the silicon level to address functional safety requirements defined or demanded at system level to comply with standards like ISO 26262, IEC 61508 etc.

Further, the conventional systems and methodologies use different systems to perform computation on a 2-Dimensional image and a 3-Dimensional image. It is to be noted that different type of system needs to be implemented to perform the computation on the 2-Dimensional image and the 3-Dimensional image. Thus, there is a need of a system that can be used to perform the computation for the 2-Dimensional image and the 3-Dimensional image based on the computation demand and also contain functional safety mechanisms.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for performing, a convolution operation with functional safety and the concepts are further described below in the detailed description. This summary is not intended to identify essential features of the claimed subject matter nor is it intended for use in determining or limiting the scope of the claimed subject matter.

In one implementation, a Convolution Multiply and Accumulate-Xtended (CMAC-X) system for performing a convolution operation with functional safety mechanism is disclosed. The CMAC-X system may comprise a local controller configured to generate a set of signals comprising a first signal, a second signal, a third signal, a fourth signal, and a fifth signal. The set of signals may be generated upon receipt of image data pertaining to an image. The image data may comprise a set of feature matrix, depth information and a kernel size. Further, the CMAC-X system may comprise a Multiply and Accumulator (MAC) configured to generate convoluted data by performing a convolution operation on each feature matrix upon receipt of the first signal. The convolution operation may be performed by multiplication of each feature, from the feature matrix, with the depth information. The CMAC-X system may further comprise an accumulator configured to generate accumulated data based on accumulation of the convoluted data, when the convolution operation on each feature matrix is performed. The accumulator may accumulate the convoluted data upon receipt of the second signal, The CMAC-X system may further comprise an adder configured to generate added data based on addition of a predefined value to the accumulated data upon receipt of the third signal. The CMAC-X system may further comprise an activation block configured to filter the added data in order to provide a convolution result for the image. The activation block may filter the added data by using a filter function upon receipt of the fourth signal, The CMAC-X system may further comprise a functional safety unit enabled upon receipt of the fifth signal. The functional safety unit may be configured to verify a functionality of each of the MAC function, the accumulator, the adder and the activation block. The functional safety unit may comprise a Built-In Self-Test (BIST) block configured to validate an output generated from each of the MAC function, the accumulator, the adder and the activation block. The output may be validated based on a comparison of the output with a predefined pattern. The functional safety unit may further comprise one or more module redundancy units communicatively coupled to each of the local controller, the MAC function, the accumulator, the adder, and the activation block. The one or more module redundancy units may be configured to eliminate one or more fault events during the convolution operation. The functional safety unit may further comprise a debug register configured to capture the one or more fault events associated with the convolution operation. The debug register may be communicatively coupled to each of the redundancy unit from the one or more module redundancy units, thereby performing the convolution operation on the image with functional safety mechanism.

In another implementation, a method for performing a convolution operation in a Convolution Multiply and Accumulate (CMAC-X) system with functional safety mechanism is illustrated. The method may comprise receiving, by a local controller, image data associated with an image. The image data may comprise a set of feature matrix, depth information and a kernel size. Further, the method may comprise generating, by a Multiply and Accumulator (MAC) function, convoluted data based on an execution of a convolution operation for each feature matrix. The convolution operation may be executed by multiplication of each feature, from the feature matrix, with the depth information. The method may further comprise performing, by an accumulator, an accumulation of the convoluted data to generate accumulated data when the convolution operation for each feature matrix is performed. The method may further comprise adding, by an adder, a predefined value to the accumulated data to generate added data. The method may further comprise filtering, by an activation block, the added data by using a filter function to provide a convolution result for the image. The method may further comprise verifying, by a functional safety unit, functionality of each of the MAC function, the accumulator, the adder, and the activation block. The functional safety unit may comprise a Built-In Self-Test (BIST) block configured to validate an output generated from each of the MAC function, the accumulator, the adder, and the activation block. The output may be verified based on a comparison of the output with a predefined pattern. The functional safety unit may comprise one or more module redundancy units configured to eliminate one or more fault events during the convolution operation. The functional safety unit may further comprise a debug register configured to capture the one or more fault events associated with the convolution operation, thereby performing the convolution operation on the image with functional safety mechanism.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "receiving," "generating," "performing," "executing," "adding," and "filtering," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for performing a convolution operation with functional safety mechanism are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention may perform a convolution operation on an image using a Convolution Multiply and Accumulate (CMAC-X) system 102 with functional safety mechanism. It is to be noted that the CMAC-X system 102 may utilize already available on-chip resources of at least Field Programmable Gate Arrays (FPGA) and Application Specific integrated Circuits (ASIC). Example of the on-chip resources include, but not limited to, registers, Digital Signal Processing (DSP) chips, memory controllers, multipliers, multiplexers, and adders. It is to be noted that the CMAC-X system 102 may adapt various versions of kernel sizes including, but not limited to, 3×3, 5×5, 7×7, 9×9, and N×N.

In order to perform the convolution operation on the image with functional safety mechanism, initially, image data pertaining to an image may be received. The image data may comprise a set of feature matrix, a kernel size, and depth information. In an implementation, the image may comprise a set of layers. Each layer may be used for convolution operation of the image. Further, one layer may comprise different kernel size than another layer. Upon receipt of the image data, the convolution operation may be performed for each feature matrix to generate convoluted data. The convolution operation may be performed by multiplication of each feature, from the feature matrix, with the depth information. Once the convoluted data for each feature matrix is generated, the convoluted data may be accumulated to generate the accumulated data. Further, a predefined value may be added to the accumulated data to generate added data. Upon addition of the predefined value, the added data may be filtered using a filter function to provide a convolution result for the image. Further, a functionality of each of one or more computing blocks used in the CMAC-X system may be verified by a functional safety unit, thereby performing the convolution operation on the image with functional safety mechanism.

Figure 1:
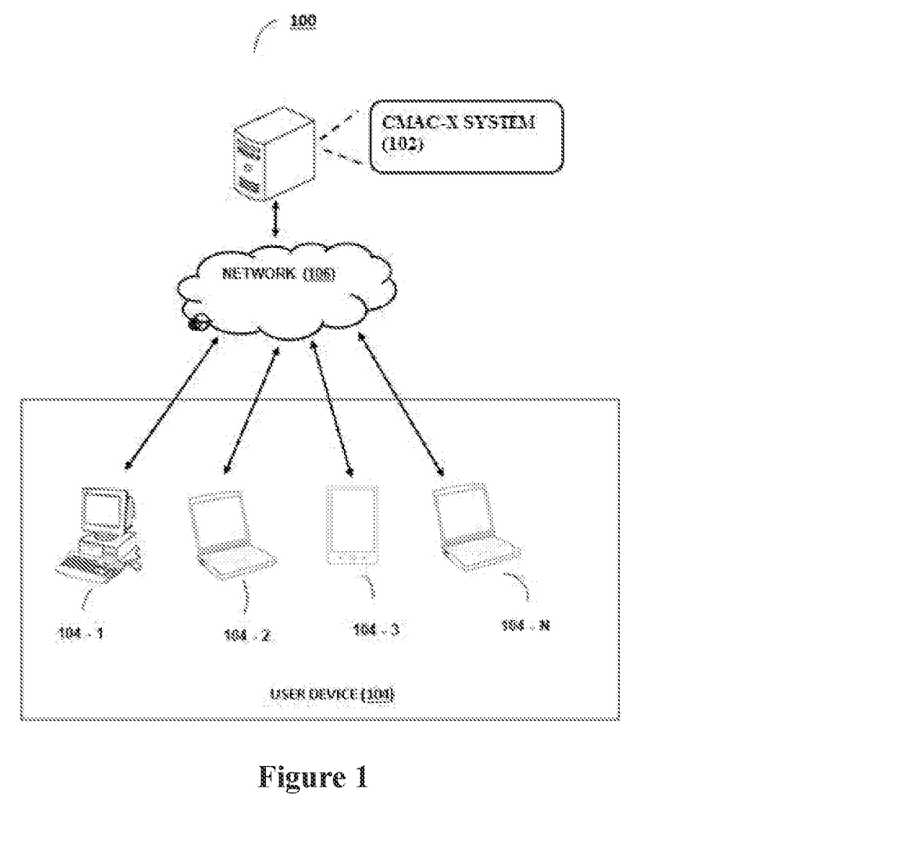
FIG. 1 illustrates a network implementation of a Convolution Multiply and Accumulate-Xtended (CMAC-X) system 102 for performing a convolution operation with functional safety mechanism, in accordance with an embodiment of the present subject matter.

Referring now to FIG. 1, a network implementation 100 of a Convolution Multiply and Accumulate-Xtended (CMAC-X) system 102 for performing a convolution operation with functional safety mechanism is disclosed. Although the present subject matter is explained considering that the CMAC-X system 102 is implemented on a server, it may be understood that the CMAC-X system 102 may also be implemented in a variety of computing systems, such as a laptop computer, a desktop computer, a notebook, a workstation, a mainframe computer, a server, a network server, and the like. In one implementation, the CMAC-X system 102 may be implemented over a cloud network.

Further, it will be understood that the CMAC-X system 102 may be accessed by multiple users through one or more user devices 104-1, 104-2 ... 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the CMAC-X system 102 may receive image data pertaining to an image. The image data may comprise a set of matrix, a kernel size and depth information. Upon receiving the image data, the CMAC-X system 102 may generate a set of signals. The set of signals may comprise a first signal, a second signal, a third signal a fourth signal, and a fifth signal.

Further, the CMAC-X system 102 may perform a convolution operation each feature matrix to generate convoluted data. The convolution operation may be performed based on multiplication of each feature, from the feature matrix, with the depth information. Once the convoluted data is generated, the CMAC-X system 102 may accumulate the convoluted data, when the convolution operation on each feature matrix is performed. Based on the accumulation of the convoluted data, accumulated data may be generated.

Further, the CMAC-X system 102 may add a predefined value to the accumulated data. Upon addition of the predefined value to the accumulated data, added data may be generated. The CMAC-X system 102 may further filter the added data using a filter function. The CMAC-X system 102 may further comprise a functional safety unit to verify a functionality of the CMAC-X system 102, thereby performing the convolution operation on the image with functional safety mechanism.

Figure 2:
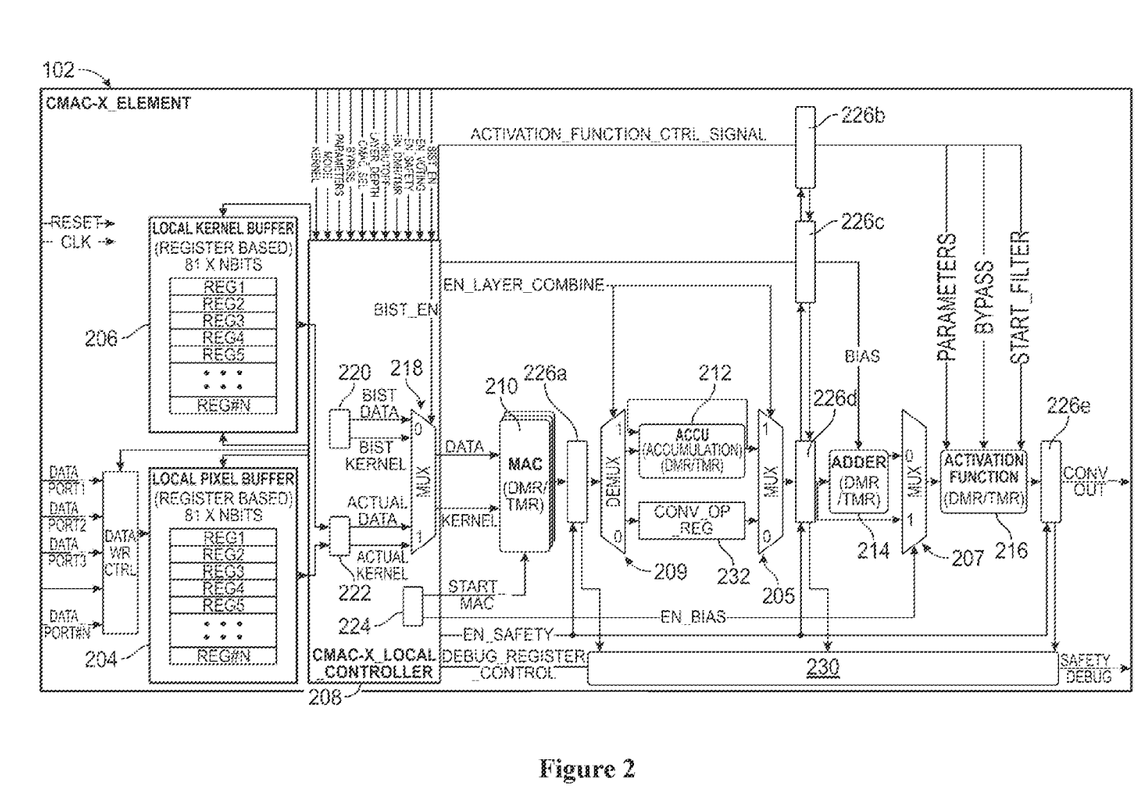
FIG. 2 illustrates a hardware implementation of a Convolution Multiply and Accumulate-Xtended (CMAC-X) system 102 for performing a convolution operation with functional safety mechanism, in accordance with an embodiment of the present subject matter.

Referring now to FIG. 2, a hardware implementation of a Convolution Multiply and Accumulate (CMAC-X) system 102 for performing convolution operation with functional safety mechanism is disclosed. The CMAC-X system 102 may comprise a local pixel buffer 204, a local kernel buffer 206, a local controller 208, and one or more computing blocks. The one or more computing blocks may comprise a Multiply and Accumulate (MAC) 210, an accumulator 212, an adder 214, an activation block 216. Further, the CMAC-X system 102 may comprise a functional safety mechanism implemented through a functional safety unit. The functional safety unit may comprise a Built-In Self-Test (BIST) block 220, one or more module redundancy units 226, and a debug register 230, Further, the CMAC-X system 102. may comprise multiple data ports configured to load data concurrently into the local pixel buffer 204. Example of the multiple data ports comprise DATA_PORT1, DATA_PORT2, DATA_PORT3 and the like. The one or more module redundancy units 226 may comprise one or more Double Module Redundancy (DMR) or Triple Module (TMR) units and one or more DMR/TMR voting units.

The CMAC-X system 102 may be implemented using one of Field Programmable Gate Arrays (FPGA), Application Specific Integrated Circuits (ASIC) or Graphical Processing Unit (GPU). The on-chip resources may comprise a multiplexer-1 referred as Mux-1 205, a multiplexer-2 referred as Mux-2 207, a multiplexer-3 refereed as Mux-3 218, and a de-multiplexer referred as Demux 209.

It is to be understood that a user may interact with the CMAC-X system 102 via an interface. The interface may include a variety of software and hardware interfaces, for example, a web interface, a graphical user interface, and the like. The interface may allow the CMAC-X system 102 to interact with the user directly or through other client devices. Further, the interface may enable the CMAC-X system 102 to communicate with other computing devices, such as web servers and external data servers (not shown). The interface may facilitate multiple communications within a wide variety of networks and protocol types, including wired networks, for example, LAN, cable, etc., and wireless networks, such as WLAN, cellular, or satellite. The interface may include one or more ports for connecting a number of devices to one another or to another server. In an implementation, the interface may facilitate on-chip communication by implementing on-chip bus protocols including, but not limited to, Advanced Microcontroller Bus Architecture (AMBA) Advanced High-Performance bus (ABB) and Advanced Extensible Interface (AXI), Wishbone Bus, Open Core Protocol (OCP) and Core Connect Bus. In other implementation, the interface may facilitate off-chip communication by implementing off-chip bus protocols including, but not limited to, Universal Serial Bus (USB), Peripheral Component Interconnect Express (PCIe), and High speed interfaces.

The local controller 208 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one aspect, the local controller 208 may include routines, programs, objects, components, data structures, etc., which perform particular tasks or implement particular abstract data types.

Further, the local controller 208 may further be connected to the local pixel buffer 204 and the local kernel buffer 206. The local controller 208 may store kernel data associated with the image in the local kernel buffer 206. Further, the local controller 208 may store pixel data of the image in the local pixel buffer 204. The local pixel buffer 204 may receive the pixel data via multiple data ports that are configured to load data concurrently.

In one embodiment, the local controller 208 may receive the image data pertaining to the image. The image data may comprise a set of filter matrix, a kernel size, and depth information. The local controller 208 may receive the kernel size via a kernel signal. The local controller 208 may receive the depth information via a LAYER_DEPTH signal. Further, the local controller 208 may store the kernel size in the local kernel buffer 206, and the set of feature matrix in the local pixel buffer 204.

In one aspect, size of the local pixel buffer 204 and the local kernel buffer 206 may be based on the kernel size. The local pixel buffer 204 and the local kernel buffer 206 may comprise a set of registers to store the set of feature matrix and the kernel size. In one example, if the kernel size is 9×9, then the size of the local pixel buffer 204 and the local kernel buffer 206 may comprise 81 register locations.

Upon receipt of the image data, the local controller 208 may generate a set of signals. The set of signals may comprise a first signal, a second signal, a third signal, a fourth signal, a fifth signal and the like. The first signal may be a START_MAC signal to perform the convolution operation, The second signal may be a EN_LAYER_COMBINE signal to accumulate convoluted data. The third signal may be a BIAS signal to add a predefined value to the accumulated data. The fourth signal may be a ACTIVATION_FUNCTION_CTRL_SIGNAL to filter added data. The fifth signal may be a functional safety signal EN_SAFETY. The EN_SAFETY signal may indicate the functional safety control signals together such as EN_DMR/TMR, EN_VOTING, BIST_EN, DEBUG_REGISTER_CONTROL etc. in order to create a flexible safely mechanism for the CMAC-X system 102.

Further, the local controller 208 may provide a MODE signal to the MAC function 210. The MODE signal may indicate kernel size for the convolution operation.

The local controller 208 may further comprise a BIST block 220, an actual data and kernel block 222, a MUX-3 218, and a local control signal generation block 224. The MUX-3 218 may either receive a first input from the actual data and kernel data block 222 or a second input from the BIST block 220. Upon receiving the first input, the MUX-3 218 may be configured to further perform computation for the actual data and kernel data received from the actual data and kernel data block 222. On the other hand, the MUX-3 218 may receive the second input from the BIST block 220, when the BEST block 220 may enabled by the fifth signal indicating a BIST_En signal. The BIST block 220 may be enabled to inject a predefined pattern to any of the computing blocks i.e. the MAC function 210, the accumulator 212, the adder 214, or the activation block 216. The BIST block 220 may be configured to validate the functionality of each of the computing blocks by comparing the computation performed independently by each of computing block against the predefined pattern. The predefined pattern may be optionally user defined, thereby making the BIST block 220 optionally user configurable. The BIST block 220 may help in identifying one or more fault events in the one or more computing blocks. Thus, at any point of the time, the BIST block 220 may be enabled on-demand by the user or based on an in-built self-test mechanism of the CMAC-X system 102.

Further, the local control signal generation block 224 may be configured to activate one or more of the computing blocks based on receiving the set of signals by the local controller 208.

Further, the local controller 208 may be connected to the MAC function 210. In one aspect, the MAC function 210 may receive the set of feature matrix, the depth information from the local controller 208 via data signal. Further, the MAC function 210 may receive the kernel size from the local controller 208 via a kernel signal. The MAC function 210 may further receive the MODE signal from the local controller 208. The MODE signal 208 may indicate the kernel size associated with a particular layer from the set of layers. Further, the MAC function 210 may receive a START_MAC signal, from the local controller 208, to start the convolution operation. Upon receiving the START_MAC signal, the MAC function 210 may be configured to perform the convolution operation for each feature matrix. Further, the MAC function 210 may also comprise a DMR/TMR unit from the one more module redundancy units 226. The DMR/TMR unit may be activated when a user may require functional safety to be enabled. In one aspect, the MAC function 210 may be duplicated two times when the DMR unit is activated. In another aspect, the MAC function 210 may be duplicated three times when the TMR unit is activated.

In one embodiment, the MAC function 210 may be configured to generate the convoluted data based on the convolution operation. The convolution operation may be performed by multiplication of each feature, from the feature matrix, with the depth information. In one example, the convolution operation may be performed for each layer of the image.

The MAC function 210 may be further connected to the accumulator 212 via the Demux 209. In one aspect, the Demux 209 may receive an input signal from the MAC function 210 and generate two output signals based on receiving the EN_LAYER_COMBINE signal from the local controller 208. Further, one output signal of the Demux 209 may be connected to the accumulator 212, and another output signal of the Demux 209 may be connected to the Mux-1 205 via CONV_OP_REG signal 232.

Once the convoluted data is generated, the accumulator 212 may perform accumulation of the convoluted data, when the convolution operation for each feature matrix is performed. In one aspect, the accumulation may be performed by combining the convoluted data associated with each layer from the set of layers, The accumulator 212 may perform the accumulation upon receiving the EN_LAYER_COMBINE signal from the local controller 208, The EN_LAYER_COMBINE signal may instruct to perform accumulation of the convoluted. data. In one aspect, the local controller 208 may disable the EN_LAYER_COMBINE signal.

In one embodiment, the accumulator 212 may also comprise a DMR/TMR unit. The DMR/TMR unit may be activated when a user may require functional safety to be enabled. In one aspect, the accumulator 212 may be duplicated two times when the DMR unit is activated. In another aspect, the accumulator 212 may be duplicated three times when the TMR unit is activated.

In one aspect, the accumulation may be performed, when the convolution operation is the 3-Dimensional convolution operation. This is because, in the 3-Dimensional convolution operation, multiple features need to be convoluted. In another aspect, the accumulation may be disabled, when the convolution operation is the 2-Dimensional operation. This is because, in the 2-Dimensional convolution operation, single feature needs to be convoluted.

In one example, construe the kernel size of the image 3×3. In this case, the convoluted data may be moved to the accumulator 212 at the end of $9^{th}$ iteration. In other words, the accumulation of the convoluted data may be performed, when the Demux 209 selects the output signal connected to the accumulator 212 upon receiving the EN_LAYER_COMBINE signal. It is to be noted that the EN_LAYER_COMBINE signal may be enabled, when the 3-Dimensional convolution operation is to be performed.

In one embodiment, the Demux 209 may select the other output signal connected to the Mux-1 205. The other output signal may be selected, when the 2-Dimensional convolution is to be performed. In one aspect, the Mux-1 205 may receive two input signals such as one input signal from an output of the accumulator 212, and other output signal from the Demux 209.

Further, the Mux-1 205 may be connected to the adder 214. Once the accumulated data is generated, the adder 214 may add a predefined value to the accumulated data to generate the added data. The adder 214 may add the predefined value upon receiving the BIAS signal from the local controller 208. The BIAS signal may instruct to add the predefined value to the added data. In other words, the BIAS signal may be added to the accumulated data at the adder 214. In one aspect, the local controller 208 may disable the BIAS signal.

In one embodiment, the adder 214 may also comprise a DMR/TMR unit. The DMR/TMR unit may be activated when a user may require functional safety to be enabled. In one aspect, the adder 214 may be duplicated two times when the DMR unit is activated. In another aspect, the adder 214 may be duplicated three times when the TIM unit is activated.

The adder 214 may be further connected to a Mux-2 207. The Mux-2 207 may receive an EN_BIAS signal from the local controller 208. The EN_BIAS signal may bypass the MAC element 210, the accumulator 212 and the adder 214. The Mux-2 207 may receive one input signal from an output of the adder 214 and other input signal from the output of the Mux-1 205. Further, an output of the Mux-2 207 may be connected to the activation block 216.

Further, the activation block 216 may filter the added data upon receiving the ACTIVATION_FUNCTION_CTRL_SIGNAL from the local controller 208 via one of the module redundancy unit from the one or more module redundancy units. The added data may be filtered using a filter function to provide a convolution result for the image. Example of the filter function include, but not limited to, a Rectified Linear Unit (ReLU), Sigmoid or Logistic, and Hyperbolic tangent function-Tank.

In one embodiment, the ACTIVATION_FUNCTION_CTRL_SIGNAL may be one of a PARAMETERS signal, a BYPASS signal or a START_FILTER. signal. The activation block 216 may receive a set of parameters from the local controller 208 from the PARAMETERS signal. The set of parameters may be used for filtering the added data. Further, the activation block 216 may receive the BYPASS signal to bypass the Activation Function operation. The activation block 216 use the filter PARAMETERS when START_FILTER signal is activated. In one aspect, the local controller 208 may disable the ACTIVATION_FUNCTION_CTRL_SIGNAL.

In one embodiment, the activation block 216 may comprise a DMR/TMR unit. The DMR/TMR unit may be activated when a user may require functional safety to be enabled. In one aspect, the activation block 216 may be duplicated two times when the DMR unit is activated. In another aspect, the activation block 216 may be duplicated three times when the TMR unit is activated.

It is to be noted that the convoluted result for the image may be generated utilizing the MAC function 210, the accumulator 212, the adder 214, the activation block 216.

Further, the CMAC-X system 102 may comprise one or more DMR/TMR voting units from the one or more module redundancy units 226 indicating the functional safety mechanism.

In one aspect, the functional safety unit may be automatically triggered upon reaching a set temperature threshold level. In another aspect, the functional safety unit may be triggered manually by the user. The one or more DMR/TMR voting units 226 from the one or more module redundancy units 226 may be configured to eliminate one or more fault events during the convolution operation, upon receiving the fifth signal i.e. EN_SAFETY. The one or more fault events may indicate one or more of a bit flip, a struck 0 fault or a struck 1 fault. The one or more DMR/TMR voting units 226 may be communicatively coupled to each of the local controller 208, the Multiply and Accumulator (MAC) function 210, the accumulator 212, the adder 214, and the activation block 216.

The one or more DMR/TMR voting units 226 may comprise a first, a second, a third, a fourth, and a fifth DMR/TMR voting unit. The first DMR/TMR voting unit 226a may be connected to the MAC function 210. The second DMR/TMR voting unit 226b may be connected to the activation function control signal. The third DMR/TMR voting unit 226c may be connected to the adder 214. The fourth DMR/TMR voting unit 226d may he connected to the MUX-1 205 of the accumulator 212. The fifth DMR/TMR voting unit 226e may be connected to the activation block 216.

The one or more DMR/TMR voting units 226 may be added in the data path and control path that may be configured and controlled (example: enabled or disabled) according to a configuration done by the local controller 208. The DMR/TMR voting units may be connected at each level in order to detect and eliminate fault events due to bit flip using register duplication and diagnostics features. The functional safety unit may help to overcome a Single Event Upset (SEU) and Single Event Transition (SET) fault events due to bit flip, which may cause a functional failure. The DMR/TMR voting units 226 may be configured to perform a voting in order to identify a correct output based on majority. For example, an output value generated by the MAC function 210 may get corrupted upon reaching the next computing block i.e. the accumulator 212. Thus, the functionality of the MAC function 210 i.e. computed output of the MAC function 210 is required to be validated. Thus, the corresponding DMR/TMR voting unit is enabled based on receiving the EN_SAFETY signal. The one or more DMR/TMR voting units 226 may duplicate an output of the MAC function 210 (or any of the computing block) and a voting will be performed and the voted value will be considered as correct value, thereby validating the output of the MAC function 210.

In one embodiment, use case examples of the one or more DMR/TMR voting units 226 are shown.

Use Case Example1: When the TMR is enabled there will be three instances of the MAC function 210, the accumulator 212, the adder 214, the activation block 216, blocks which connects to the respective one or more voting units 226.

Use Case Example2: When the TMR voting function alone is enabled, the input data to the respective voting unit will be replicated thrice and voting will be performed.

Further, based on the application requirement, a HOST processor may enable and select the respective functional safety unit provided (at stages of data. and control path), when the CMAC-X system 102 is working on a specific layer feature map. The respective functional safety unit incorporated in CMAC-X system 102 may be enabled or disabled as per the application requirements.

In one example, considering a CNN network has 5 layers and the 5th layer generates 4 feature map of size 16×16 which will be used for flattening. Thus, the HOST may enable the functional safety unit for this layer 5 alone.

Further, as described above the activation block 216 may be further connected to the fifth DMR/TMR voting unit 226e from the one or more module redundancy units 226. The filtered output of the activation block 216 may be passed through the fifth DMR/TMR voting unit 226e in order to generate a fault free convoluted output. Further, the output of the activation block 216 may be a CONV_OUT signal indicating the convoluted result for the image.

Further, the functional safety unit of the CMAC-X system 102 may comprise a debug register 230 configured to capture the one or more fault events associated with the convolution operation. The debug register 230 may be enabled based on the fifth signal indicating a DEBUG_REGISTER_CONTROL signal. The debug register 230 may be connected for diagnostics feature in order to capture a number of fault events occurred while performing convolution operation, the BIAS and the filtering. The debug register 230 may be communicatively coupled to each of the one or more DMR/TMR voting units 226.

Further, for every computation, the CMAC-X system 102 may keep track of the one or more fault events (example: Stuck 0 or 1) when detected and update the debug register 230. When the user defined fault threshold reaches, the debug register values may help the HOST or local controller 208 to take necessary corrective action. The output of the debug register 230 may be a SAFETY_DEBUG signal.

It is to be noted that the fault free convoluted result for the image with functional safety may be generated utilizing the MAC function 210, the accumulator 212, the adder 214, the activation block 216, the BIST block 220, the one or more module redundancy units 226, and the debug register 230.

In one embodiment, the CMAC-X system 102 may be shut off based on receiving a SHUTOFF signal from the local controller 208. The SHUTOFF signal may indicate a turn off command. In one aspect, when the CMAC-X system 102 is implemented on the FPGA, during the shut-off scenario, the clock to the CMAC-X system 102 may be turned off. In another aspect, when the CMAC-X system 102 is implemented on the ASIC, during the shut-off scenario, the clock and the power to the CMAC-X system 102 may be turned off.

It is to be noted that multiple CMAC-X systems may he implemented to perform parallel row wise convolution operation. In one aspect, the multiple CMAC-X systems may be grouped to perform the convolution operation on the image. The CMAC-X system 102 may be utilized to perform the convolution operation in at least one of a Deep Neural Network (DNN), a Convolution Neural Network (CNN), a Recurrent Neural Network (RNN) and the like.

Figure 3:
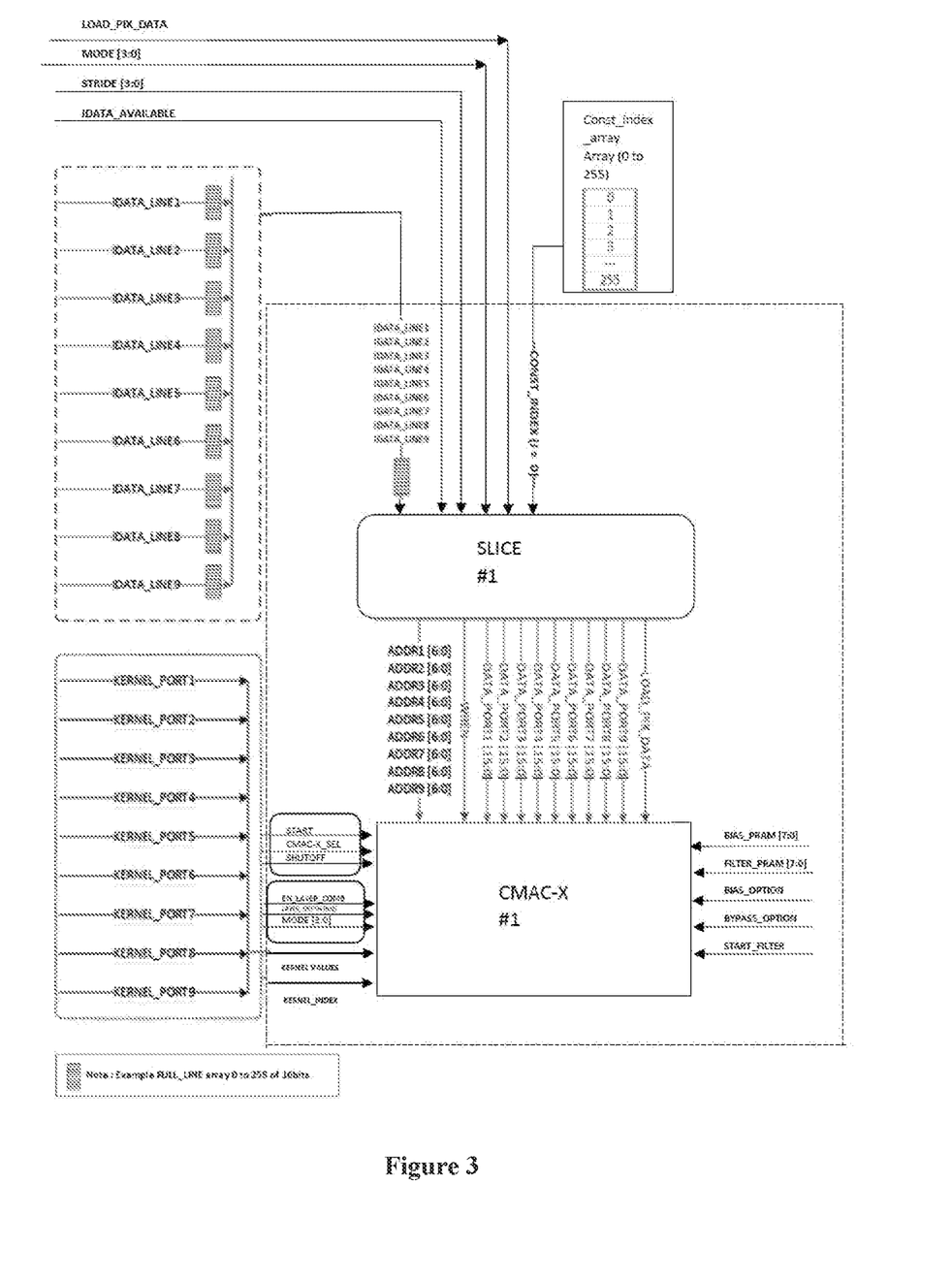
FIG. 3 illustrates a schematic diagram of data and kernel loading into the CMAC-X system 102, in accordance with an embodiment of the present subject matter.

Referring now to FIG. 3, a schematic diagram of data and kernel loading into the CMAC-X system 102 is illustrated in accordance with an embodiment of the present subject matter.

The image data and kernel data may be loaded into the CMAC-X element via a slice unit. All the necessary control signal for the SLICE unit will be provided by local controller 208. For example: If the CMAC-X and SLICE architecture is designed with 9 DATA and 9 KERNEL ports, then 9 pixel values can be concurrently loaded from the input feature map and 9 kernel values from the Kernel Memory Space, Each CMAC-X system 102 from the multiple CMAC-X systems may be associated with a slice unit that may help in loading the input feature map data into the local controller 208.

For example: If the local controller 208 and slice unit is designed with 9 DATA and 9 KERNEL ports, then 9 pixel values can be concurrently loaded from the input feature map and 9 kernel values from the Kernel Memory Space. Assume when the processing is done for 3×3 matrix all the 9 input pixel values are loaded into the local controller 208 concurrently.

The ADDRESS generated from the slice unit may be used to load the pixel data into the local pixel buffer 204 concurrently and accordingly load all the kernel values into the local kernel buffer 206 of the local controller 208 concurrently. Further, all the necessary control signals for the slice and CMAC-X system 102 may he provided by the local controller 208 that controls multiple CMAC-X systems. The CONST_INDEX (Constant Index Array) signal may enables to replicate the multiple slice units at system level (as an example assume if the system requires 256 CMAC-X, then there will be 256 Slice units generated using the CONST_INDEX array signal.).

Figure 4:
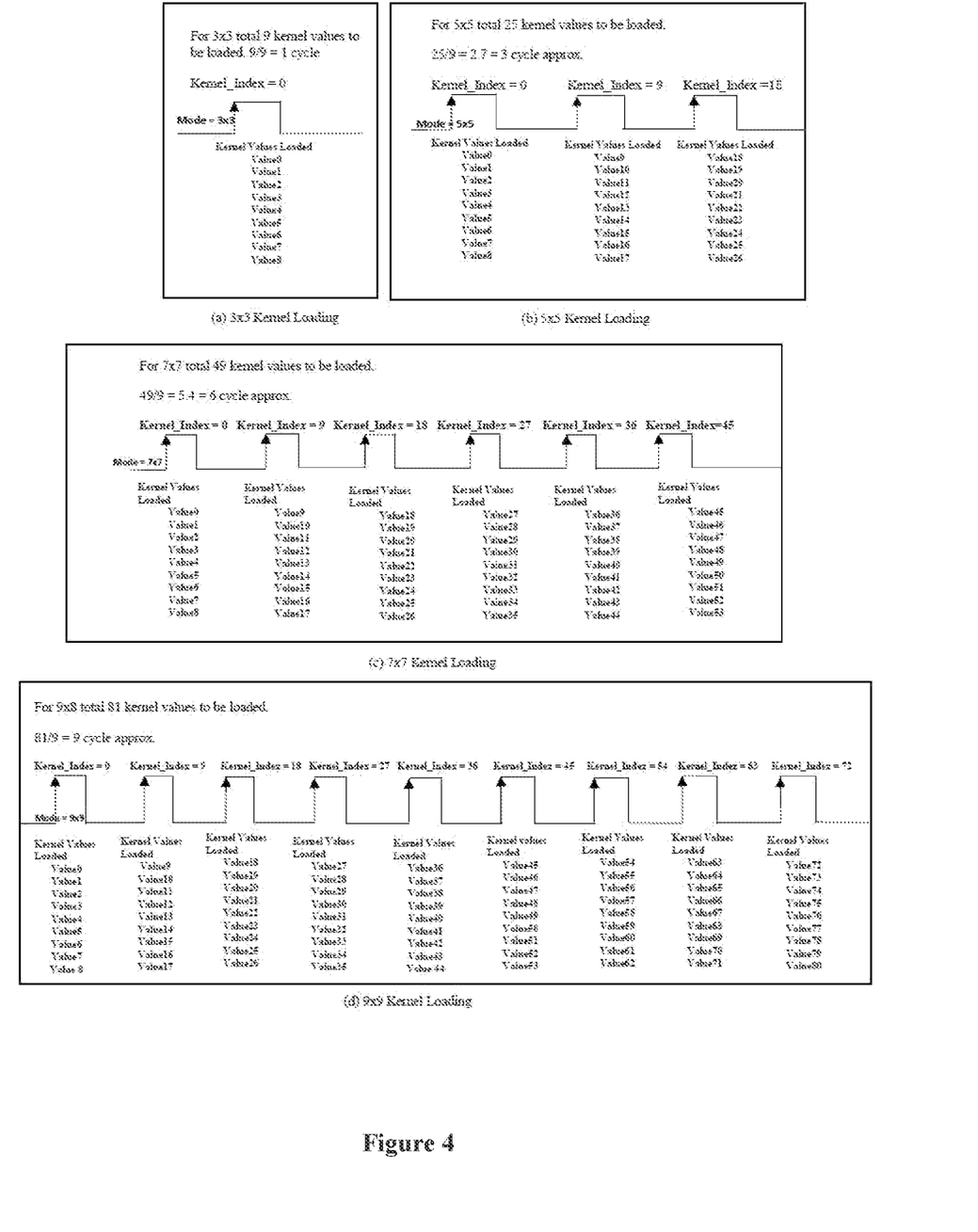
FIG. 4 illustrates a schematic diagram of kernel loading of different sizes into the CMAC-X system 102, in accordance with an embodiment of the present subject matter.

Referring now to FIG. 4, a schematic diagram of kernel loading of different sizes into the CMAC-X system 102 is illustrated, in accordance with an embodiment of the present subject matter.

The kernel of different sizes (example: 3×3, 5×5, 7×7, 9×9) may be loaded into the CMAC-X system 102 based on the KERNEL_INDEX signal according to the network type and requirements. Each CMAC-X system 102 may have a local kernel buffer 206 for storing the kernel values for performing the convolution operation.

The CMAC-X system 102 may handle parallel kernel loading (to accommodate different kernel sizes). The KERNEL_INDEX signal may act as an offset pointer for loading the kernel values into the CMAC-X system 102.

Example1: Kernel Loading for size 3×3
Using the CMAC-X system 102 9 ports, all the 9 values will be loaded into CMAC-X system 102 internal memory.

Example2: Kernel Loading for size 5×5
Using the CMAC-X system 102 9 ports, all the 25 values will be loaded into CMAC-X system 102 internal memory.
Kernel_Index=0, the kernel values (0 to 8 will he loaded)
Kernel_Index=9, the kernel values (9 to 17 will be loaded)
Kernel_Index=18. the kernel values (18 to 26 will be loaded), the values 25 and 26 will be ignored inside the CMAC-X system 102.

Example3: Kernel Loading for size 7×7
Using the CMAC-X system 102 9 ports, all the 49 values will be loaded into CMAC-X system 102 internal memory,
Kernel_Index=0, the kernel values (0 to 8 will be loaded)
Kernel_Index=9, the kernel values (9 to 17 will be loaded)
Kernel_Index=18, the kernel values (18 to 26 will be loaded)
Kernel_Index=27, the kernel values (27 to 35 will he loaded)
Kernel_Index=36, the kernel values (36 to 44 will be loaded)
Kernel_Index=45, the kernel values (45 to 53 will be loaded), the values 50 to 53 will be ignored inside the CMAC-X system 102.

Example4: Kernel Loading for size 9×9
Using the CMAC-X system 102 9 ports, all the 81 values will be loaded into CMAC-X system 102 internal memory.
Kernel_Index=0, the kernel values (0 to 8 will be loaded)
Kernel_Index=9, the kernel values (9 to 17 will be loaded)
Kernel_index=18, the kernel values (18 to 26 will be loaded)
Kernel_Index=27, the kernel values (27 to 35 will be loaded)
Kernel_Index=36, the kernel values (36 to 44 will be loaded)
Kernel_Index=45, the kernel values (45 to 53will be loaded),
Kernel_Index=54. the kernel values (54 to 62will be loaded), Kernel_Index=63, the kernel values (63 to 71 will be loaded), Kernel_Index=72, the kernel values (72 to 80 will be loaded).

Figure 5:
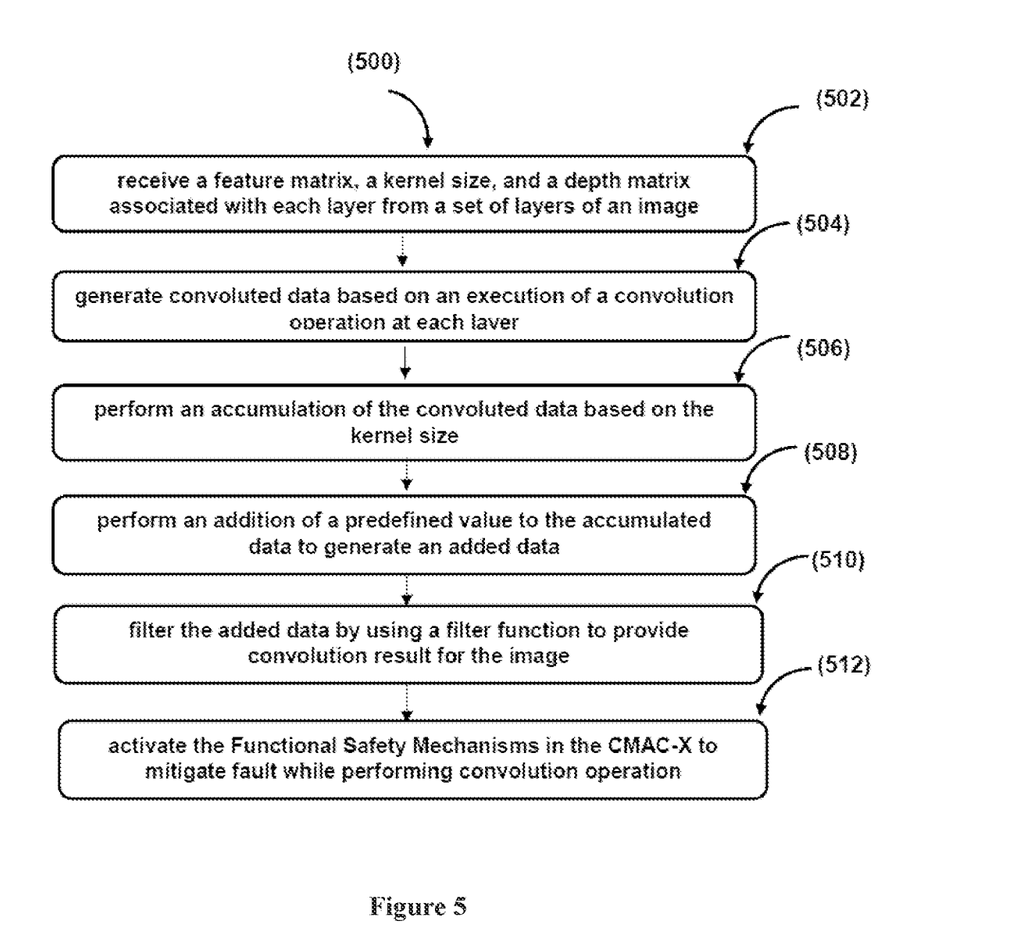
FIG. 5 illustrates a method for performing a convolution operation with functional safety mechanism, in accordance with an embodiment of the present subject matter.

Referring now to FIG. 5, a method 500 for performing a convolution operation in a Convolution Multiply and Accumulate (CMAC-X) system 102 with functional safety is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the CMAC-X system 102.

At block 502, image data pertaining to an image may be received. In one implementation, the local controller 208 may receive the image data. The image data may comprise a set of feature matrix, a kernel size and depth information.

At block 504, convoluted data may be generated based on execution of a convolution operation for each feature matrix. In one implementation, the Multiply and Accumulate (MAC) function 210 may generate the convoluted data. The convoluted data may be generated by multiplication of each feature, from the feature matrix, with the depth information.

At block 506, an accumulation of the convoluted data may be performed to generate accumulated data. In one implementation, the accumulator 212 may perform the accumulation of the convoluted data. The accumulation may correspond to combine the convoluted data, when the convolution operation for each feature matrix is performed.

At block 508, a predefined value may be added to the accumulated data. In one implementation, the adder 214 may add the predefined value to the accumulated data. Based on the addition of the predefined value to the accumulated data., added data. may be generated.

At block 510, the added data may be filtered using a filter function. In one implementation, the activation block 216 may filter the added data to provide a convolution result for the image.

At block 512, a functionality of each of the MAC function 210, the accumulator 212, the adder 214, and the activation block 216 may be verified by a functional safely unit. The functional safety unit may comprise a Built-In Self-Test (BIST) block 220 configured to validate an output generated from each of the MAC function 210, the accumulator 212, the adder 214, and the activation block 216. The output may be validated based on a comparison of the output with a predefined pattern. Further, the functional safety unit may comprise one or more module redundancy units 226 configured to eliminate one or more fault events during the convolution operation. Further, the functional safety unit may comprise a debug register 230 configured to capture the one or more fault events associated with the convolution operation, thereby performing the convolution operation on the image with functional safety.

Exemplary embodiments discussed above may provide certain advantages. Though not required to practice aspects of the disclosure, these advantages may include those provided by the following features.

Some embodiments enable a system and a method enable use of multiple Convolution Multiply and Accumulate (CMAC-X) based on on-chip resource availability.

Some embodiments enable a system and a method to reuse same resource for one or more layer.

Some embodiments enable a system and a method to reconfigure the Convolution Multiply and Accumulate (CMAC-X) system based on various kernel sizes.

Some embodiments enable a system and a method to utilize functional safety mechanism for performing the convolution operation.

Although implementations for methods and systems for performing a convolution operation with functional safety mechanism have been described in language specific to structural features and/or methods, it is to be understood that the appended claims are not necessarily limited to the specific features or methods described. Rather, the specific features and methods are disclosed as examples of implementations for performing a convolution operation in a Convolution Multiply and Accumulate (CMAC-X) system with functional safety mechanism.

The invention claimed is:

1. A Convolution Multiply and Accumulate (CMAC-X) system (102) for performing a convolution operation with functional safety mechanism, the CMAC-X system (102) comprising:

a local controller (208) configured to generate a set of signals comprising a first signal, a second signal, a third signal, a fourth signal, and a fifth signal, wherein the set of signals is generated upon receipt of image data pertaining to an image, and wherein the image data comprises a set of feature matrix, depth information and a kernel size;

a Multiply and Accumulator (MAC) function (210) configured to generate convoluted data by performing a convolution operation on each feature matrix upon receipt of the first signal, wherein the convolution operation is performed by multiplication of each feature, from the feature matrix, with the depth information;

an accumulator (212) configured to generate accumulated data based on accumulation of the convoluted data, when the convolution operation on each feature matrix is performed, wherein the accumulator (212) accumulates the convoluted data upon receipt of the second signal;

an adder (214) configured to generate added data based on addition of a predefined value to the accumulated data upon receipt of the third signal;

an activation block (216) configured to filter the added data in order to provide a convolution result for the image, wherein the activation block (216) filters the added data by using a filter function upon receipt of the fourth signal;

a functional safety unit enabled upon receipt of the fifth signal, wherein the functional safety unit is configured to verify a functionality of each of the MAC function (210), the accumulator (212), the adder (214) and the activation block (216), and wherein the functional safety unit comprising:
- a Built-In Self-Test (BIST) block (220) configured to validate an output generated from each of the MAC function (210), the accumulator (212), the adder (214) and the activation block (216), wherein the output is validated based on a comparison of the output with a predefined pattern;
- one or more module redundancy units (226) communicatively coupled to each of the local controller (208), the MAC function (210), the accumulator (212), the adder (214), and the activation block (216), wherein the one or more module redundancy units (226) are configured to eliminate one or more fault events during the convolution operation;
- a debug register (230) configured to capture the one or more fault events associated with the convolution operation, wherein the debug register (230) is communicatively coupled to each of the redundancy unit from the one or more module redundancy units (226), wherein the debug register (230) with diagnostics feature captures a number of fault events occurred while performing convolution operation, adding BIAS and Filtering, thereby performing the convolution operation on the image with functional safety mechanism.

2. The CMAC-X system (102) as claimed in claim 1, comprising a local kernel buffer (206) configured to store the kernel size.

3. The CMAC-X system (102) as claimed in claim 1, comprising a local pixel buffer (204) configured to store the set of feature matrix.

4. The CMAC-X system (102) as claimed in claim 1, comprising multiple data ports connected to the local pixel buffer (204) for parallel data loading.

5. The CMAC-X system (102) as claimed in claim 1, wherein the convolution operation is one of a 2-dimensional convolution operation or a 3-dimensional convolution operation.

6. The CMAC-X system (102) as claimed in claim 1, wherein the one more module redundancy units (226) are automatically triggered upon reaching a threshold temperature value.

7. The CMAC-X system (102) as claimed in claim 1, wherein the first signal is a START_MAC signal to perform the convolution operation, and wherein the second signal is an EN_LAYER_COMBINE signal to accumulate convoluted data, and wherein the third signal is a BIAS signal to add a predefined value to the accumulated data, and wherein the fourth signal is an ACTIVATION_FUNCTION_CTRL_SIGNAL to filter the added data.

8. The CMAC-X system (102) as claimed in claim 1, wherein the fifth signal is an EN_SAFETY signal for functional safety unit m the CMAC-X system (102).

9. The CMAC-X system (102) as claimed in claim 1, wherein the one or more module redundancy units (226) comprise one or more Double Module Redundancy (DMR) or Triple Module (TMR) units and one or more DMR/TMR voting units (226).

10. The CMAC-X system (102) as claimed in claim 1, wherein the one or more fault events may indicate one or more of a bit flip, a stuck0 fault or a stuck1 fault.

11. The CMAC-X system (102) as claimed in claim 1, wherein the BIST block (220) is one of a user configured or automatically configured through an internal self-test mechanism.

12. The CMAC-X system (102) as claimed in claim 1, supports convolution operation for kernels of different sizes by reusing the same CMAC-X system (102).

13. A method (500) for performing a convolution operation in a Convolution Multiply and Accumulate-Xtended (CMAC-X) system (102) with functional safety mechanism, the method (500) comprising:
- generating, by a Multiply and Accumulator (MAC) function (210), convoluted data based on an execution of a convolution operation for each feature matrix, wherein the convolution operation is executed by multiplication of each feature, from the feature matrix, with the depth information;
- performing, by an accumulator (212), an accumulation of the convoluted data to generate accumulated data when the convolution operation for each feature matrix is performed;
- adding, by an adder (212), a predefined value to the accumulated data to generate added data.;
- filtering, by an activation block (216), the added data by using a filter function to provide a convolution result for the image;
- verifying, by a functional safety unit, functionality of each of the MAC function (210), the accumulator (212), the adder (214) and the activation block (216), wherein the functional safety unit comprising:
  - a Built-In Self-Test (BIST) block (220) configured to validate an output generated from each of the MAC function (210), the accumulator (212), the adder (214) and the activation block (216), wherein the output is validated based on a comparison of the output with a predefined pattern;
  - one or more module redundancy units configured to eliminate one or more fault events during the convolution operation;
  - a debug register (230) configured to capture the one or more fault events associated with the convolution operation, wherein the debug register (230) with diagnostics feature captures a number of fault events occurred while performing convolution operation, adding BIAS and Filtering, thereby performing the convolution operation on the image with functional safety mechanism.

14. The method (500) as claimed in claim 1, comprising turning off the CMAC-X system (102) upon receiving a SHUTOFF signal.

* * * * *